(12) United States Patent
Sumi et al.

(10) Patent No.: US 10,874,058 B2
(45) Date of Patent: Dec. 29, 2020

(54) IRRIGATION LANDSCAPE AND GROWING SYSTEM

(71) Applicant: KNAUF INSULATION SPRL, Visé (BE)

(72) Inventors: Jure Sumi, Skofja Loka (SI); Darja Majkovic, Skofja Loka (SI)

( * ) Notice: Subject to any disclaimer, the term of this patent is extended or adjusted under 35 U.S.C. 154(b) by 117 days.

(21) Appl. No.: 16/068,108

(22) PCT Filed: Jan. 5, 2017

(86) PCT No.: PCT/EP2017/050230
§ 371 (c)(1),
(2) Date: Jul. 3, 2018

(87) PCT Pub. No.: WO2017/118710
PCT Pub. Date: Jul. 13, 2017

(65) Prior Publication Data
US 2020/0163288 A1      May 28, 2020

(30) Foreign Application Priority Data
Jan. 5, 2016    (GB) .................................. 1600117.4

(51) Int. Cl.
| | |
|---|---|
| *A01G 13/02* | (2006.01) |
| *A01G 25/02* | (2006.01) |
| *A01G 20/00* | (2018.01) |
| *A01G 24/44* | (2018.01) |
| *A01G 25/00* | (2006.01) |
| *A01G 25/06* | (2006.01) |
| *E01C 13/08* | (2006.01) |

(52) U.S. Cl.
CPC .......... *A01G 20/00* (2018.02); *A01G 13/0256* (2013.01); *A01G 13/0268* (2013.01); *A01G 24/44* (2018.02); *A01G 25/00* (2013.01); *A01G 25/02* (2013.01); *A01G 25/06* (2013.01); *E01C 13/083* (2013.01)

(58) Field of Classification Search
CPC ............ A01G 13/0256; A01G 13/0268; A01G 25/00; A01G 25/02
USPC .......................... 47/1.01 F, 21.1, 31, 32, 48.5
See application file for complete search history.

(56) References Cited

U.S. PATENT DOCUMENTS

| | | | | | |
|---|---|---|---|---|---|
| 3,613,309 | A | * | 10/1971 | Coburn ................... | A01G 9/247 47/79 |
| 8,215,570 | B2 | * | 7/2012 | Hitt ....................... | A01G 25/167 239/207 |
| 8,567,117 | B2 | * | 10/2013 | Spittle ................ | A01G 13/0268 47/9 |
| 9,511,349 | B2 | * | 12/2016 | Sumi ...................... | D04H 1/407 |

(Continued)

FOREIGN PATENT DOCUMENTS

| | | |
|---|---|---|
| DE | 38 05 069 A1 | 9/1989 |
| JP | 2012 085549 A | 5/2007 |
| JP | 2015/122983 A | 7/2015 |

(Continued)

*Primary Examiner* — David J Parsley
(74) *Attorney, Agent, or Firm* — Knauf Insulation, Inc.; James K. Blodgett; Brandon N. Hudder

(57) ABSTRACT

A fixed irrigation landscape growing system comprises: a supporting substrate; a water absorbent blanket arranged above the substrate; and a growing medium, notably a soil layer, arranged above the water absorbent blanket. Irrigation is provided by irrigation pipes or by sprinklers.

22 Claims, 5 Drawing Sheets

(56) References Cited

U.S. PATENT DOCUMENTS

2011/0042480 A1 2/2011 Hitt
2019/0040593 A1* 2/2019 Tetrault ................ E01C 13/083

FOREIGN PATENT DOCUMENTS

WO     WO 96/25034 A1   8/1996
WO   WO 2012/164044 A1  12/2012

* cited by examiner

IRRIGATION LANDSCAPE AND GROWING SYSTEM

CROSS-REFERENCE TO RELATED APPLICATIONS

This application is a U.S. national counterpart application of International Application Serial No. PCT/EP2017/050230, filed Jan. 5, 2017, under 35 U.S.C. § 371, which claims priority to GB Application Serial No. 1600117.4, filed Jan. 5, 2016, the disclosures of which are hereby incorporated herein by reference.

This invention relates to a landscape growing system, notably using a combination of a water absorbent blanket and a covering layer of soil.

In accordance with one of its aspects, the present invention provides a fixed irrigation landscape growing system comprising:
a supporting substrate;
a water absorbent blanket arranged above the substrate;
a growing medium, notably a soil layer, arranged above the water absorbent blanket; and
a plurality of spaced irrigation pipes arranged above the water absorbent blanket;
in which the average spacing between the irrigation pipes is at least 30 cm, preferably at least 40 cm, more preferably at least 45 cm.

According to another aspect, the present invention provides a fixed irrigation landscape growing system comprising:
a supporting substrate;
a water absorbent blanket arranged above the substrate;
a growing medium, notably a soil layer, arranged above the water absorbent blanket; and
a plurality of spaced circle irrigation sprinklers arranged above the growing medium;
in which the distance between a first sprinkler and at least one of its adjacent sprinklers is greater than 1.2 times the radius of the sprinkler pattern of the first sprinkler.

According to a further aspect, the present invention provides a fixed irrigation landscape growing system, notably installed in a region selected from: a Köppen climate region BWh (warm desert climate), BWk (cold desert climate), BSh (warm semi-arid climate), BSk (cold semi-arid climate), Csa (warm mediterranean climate), Csb (temperate mediterranean climate), Bahrain, Kuwait, Oman, Quatar, Saudi Arabia, the United Arab Emirates, Calif. and a Köppen zone Csb, Csa, BS and BW in California;
the landscape growing system comprising: a supporting substrate; a water absorbent blanket arranged above the substrate; a growing medium, notably a soil layer, arranged above the water absorbent blanket; and an irrigation system, notably an irrigation system selected from: an irrigation system comprising a plurality of spaced irrigation pipes arranged above the water absorbent blanket in which the average spacing between the irrigation pipes is at least 30 cm, preferably at least 40 cm, more preferably at least 45 cm; and an irrigation system comprising a plurality of spaced circle irrigation sprinklers arranged above the growing medium in which the distance between a first sprinkler and at least one of its adjacent sprinklers is greater than 1.2 times the radius of the sprinkler pattern of the first sprinkler;
in which the irrigation system is configured to supply, over at least one period of five consecutive days during i) the months of June, July and August in the northern hemisphere or ii) the months of December, January and February in the southern hemisphere, an average quantity of irrigation water which is $\geq 3$ L/m$^2$ per day and $\leq 15$ L/m$^2$ per day, preferably $\leq 12$ L/m$^2$ per day.

According to a yet further aspect, the present invention provides a method of irrigating a landscape growing system wherein the landscape growing system comprises: a supporting substrate; a water absorbent blanket arranged above the substrate; a growing medium, notably a soil layer, arranged above the water absorbent blanket; and a fixed irrigation system, notably an irrigation system selected from an irrigation system comprising a plurality of spaced irrigation pipes arranged above the water absorbent blanket and an irrigation system comprising a plurality of spaced circle irrigation sprinklers arranged above the growing medium;
wherein the method comprises supplying irrigation water to the landscape growing system through the irrigation system, notably an average quantity of irrigation water which is $\geq 3$ L/m$^2$ per day and $\leq 15$ L/m$^2$ per day, preferably $\leq 12$ L/m$^2$ per day over at least one period of five consecutive days during i) the months of June, July and August in the northern hemisphere or ii) the months of December, January and February in the southern hemisphere.

The dependent claims define preferred and/or alternative embodiments.

The term "fixed irrigation landscape growing system" or "fixed irrigation system" as used herein means a growing system in which, during application of irrigation water to the landscape, the irrigation outlets, for example irrigation sprays, irrigation nozzles or irrigation pipes, remain in a fixed position with respect to the landscape. This is in contrast to mobile irrigation system, for example an irrigation trailer having series of water sprays which is advanced over a landscape by a tractor. The irrigation outlets of the fixed irrigation landscape growing system may be permanently fixed, that is to say they may be kept in the same position in a permanent structure, for example by irrigation pipes being incorporated in the soil or growing medium or by irrigation sprays or irrigation nozzles being secured by permanent building structures such as concrete posts. Alternatively, the irrigation outlets of the fixed irrigation landscape growing system may be moveable, for example comprising moveable irrigation pipes laid on top of the ground or moveable irrigation sprays or irrigation nozzles arranged on spikes or posts which are removably embedded in the ground.

Specific challenges presented by fixed irrigation landscape growing systems include a desire to optimise capital investment, efficient water management and vegetation growth. A particular challenge is to ensure consistency of the quality and appearance of the vegetation over the entire landscape; for example, a poor patch of vegetation adjacent to good or lush vegetation detracts noticeably from desired homogeneity. The desired homogeneity of the vegetation over a large area may be ensured by overwatering; this ensures that all areas receive adequate water for optimum vegetation growth but is wasteful of available water resources. Alternatively, reducing the spacing between irrigation sprays may improve homogeneity of water distribution but requires greater capital investment and more complex irrigation systems.

In some of its aspects, the present invention is based on the realisation that good vegetation homogeneity can be achieved by the combination of features described and claimed herein. The invention is particularly advantageous for use in arid climates and/or in a Köppen climate zone B or zone C, notable in one of the following Köppen climate zones: BWh (warm desert climate); BWk (cold desert climate); BSh (warm semi-arid climate); BSk (cold semi-arid climate); Csa (warm mediterranean climate); Csb (temperate mediterranean climate); Csc (Cold-summer Mediterranean). The invention is particularly applicable for use in climate zone BWh (warm desert climate) and/or in a country selected from Bahrain, Kuwait, Oman, Quatar, Saudi Arabia and The United Arab Emirates. It is also particularly applicable for use in California, notably in climate zones Cs, BS and BW in California. Irrigation requirements in such climates zones are incompatible with requirements in other or more temperate climate zones such as Köppen zones Cw and Cf. The invention may be used for a landscape in a climate in which, for the summer months, particularly during June, July and August for the northern hemisphere, a) the average monthly rainfall is ≤10 mm or ≤5 mm and/or b) the average day time temperature is ≥25° C. or ≥30° C.

The landscape of the growing system may by a park, a public or residential garden, a green roof, a cemetery or a sports facility, for example a sports pitch or a golf course. The system is particularly suitable for relatively large landscapes or areas of vegetation, for examples having an area which is ≥2000 m$^2$, notably ≥5000 m$^2$, ≥10000 m$^2$ or ≥20000 m$^2$. The landscape may be substantially horizontal and planar, for example in the case of a sports pitch. However, the growing system is advantageous for landscapes which are undulating or non-planar, for example landscapes incorporating distinct slopes and/or having differences in elevation which are ≥0.5 m, ≥0.7 m, ≥1 m or ≥2 m.

In accordance with some embodiments where the system includes irrigation pipes, for example sprinkler hoses, non-sprinkler hoses or dripline irrigation hoses, the average spacing between adjacent irrigation pipes, preferably between each pair of adjacent irrigation pipes of the system, is at least 30 cm; it may be ≥40 cm, ≥50 cm, ≥60 cm, ≥80 cm, ≥1 m or ≥1.2 m and/or ≤2 m or 1.6 m. The average spacing refers to portions of the irrigation pipes at which water is distributed at the landscape. Where the adjacent irrigation pipes are parallel, the average distance is simply the distance between the parallel irrigation pipes at the portions at which water is distributed at the landscape. The ability to provide for homogenous vegetation growth with such spacings between adjacent pipes reduces the amount of pipework required. The irrigation pipes may be sprinkler hoses or soaker hoses. Particularly when laid on top of the vegetation, the irrigation pipe may be green in colour; this allow it to visually blend with the vegetation. Alternatively, it may be of a colour intended to allow easy identification against the vegetation, for example, blue, red or orange. The irrigation pipes may provide a water drip supply or a micro-drip. Where the irrigation pipes are arranged between the water absorbent blanket and the growing medium they are preferably positioned directly on an upper surface of the water absorbent blanket and subsequently covered with the growing medium; this facilitates laying down of the system.

Where the system includes irrigation sprinklers, one or more sprinklers may be a rotor, a rotating sprinkler, a pulse sprinkler, a full or part circle pulse sprinkler or an oscillating sprinkler. The sprinklers may be arranged on spikes embedded in the growing system or on stands. The sprinkler patterns may be substantially circular when viewed from above, or have the form of a sector of a circle; in this case, the radius of the sprinkler patterns may be 1 m, ≥2 m, ≥2.5 m, ≥3 m or ≥3.5 m and/or ≤8 m or ≤5 m. As used herein, the term "circle sprinkler" means a sprinkler which provides a sprinkler pattern when viewed from above which is or which is substantially a circle or a sector or a circle. In some preferred embodiments the radius of the sprinkler patterns is ≥2 m or ≥2.5 m and/or ≤3.5 m or ≤3 m. A common practice in the arrangement of sprinklers, notably full circle sprinklers, half circle sprinklers and quarter circle sprinklers is an arrangement of "head-to-head" spacing in which adjacent sprinklers are spaced at a distance which is equal to the radius of the sprinkler pattern. In accordance with some embodiments of the present invention, the spacing between a first sprinkler and at least one of its adjacent sprinklers, preferably between the first sprinkler and each of its adjacent sprinklers, is ≥1.1 times the radius of the first sprinkler pattern; the spacing may be ≥1.2, ≥1.3, ≥1.4, ≥1.5, ≥1.6, ≥1.7, ≥1.8, ≥1.9, ≥2, ≥2.1, ≥2.2, ≥2.3, ≥2.4 or ≥2.5 and/or 53.5 or ≤3 times the radius of the sprinkler pattern. In some embodiments, the sprinkler patterns of adjacent sprinklers leaves gaps or non-sprinkled areas. Such gaps may have an area which is ≥0.01%, ≥0.03%, ≥0.05%, ≥0.08%, ≥0.1%, ≥0.2% or ≥0.3% and/or ≤5%, ≤2% or ≤1% of the area of the sprinkler pattern of one of the sprinklers. In some embodiments there is no overlap between the sprinkler pattern of adjacent sprinklers; in this case, there may be a spacing between adjacent sprinkler patterns which is ≥2 cm, ≥4 cm, ≥5 cm, ≥8 cm or ≥10 cm and/or ≤40 cm or ≤30 cm. The term "sprinkler pattern" as used herein means the extent of the area over which a sprinkler will provide irrigation water to the upper surface of the growing system when operating at its nominal system conditions, notably at its nominal or intended water pressure and water flow rate without wind. Preferably, the system comprises a plurality of sprinklers having one of more of the aforementioned features, notably at least 20, at least 30 or at least 40 such sprinklers.

The irrigation pipes or sprinklers may comprise spray nozzles.

The quantity of irrigation water distributed over the landscape by the system may be ≤75% or ≤70% of the recognised Evapotranspiration Data for the location and the time of year. The Evapotranspiration Data is preferably Evapotranspiration Data for Irrigation Scheduling and Design where such specific data exists. During summer months, notably during summer months during which daily temperatures exceed 30° C., the quantity of irrigation water distributed over the landscape by the system may be ≤60% or ≤50% of the recognised Evapotranspiration Data for the location.

The growing medium, notably a top or uppermost growing medium, is preferably a loose material; it may be selected from soil, loam or sand. Where it comprises soil, the soil may comprise sand, loam and clay. The thickness of the growing medium may be ≥0.5 cm or ≥1 cm and/or ≤30 cm, ≤20 cm ≤10 cm or ≤6 cm. The depth of the water absorbent blanket within the growing system should be selected according to the vegetation to be grown. The water absorbent blanket tends to draw irrigation water to the bottom part of the overlying growing medium, towards or in to the water absorbent blanket, and away from an exposed surface of the system. This reduces the tendency of irrigation water to evaporate from the surface and facilities efficient water management. Particularly on large landscaped areas, there may be considerable variation in the thickness of the growing medium and thus different amounts of water retained by the growing medium at different locations. The present landscaping system may be used to reduce inhomogeneity in water distribution and/or vegetation growth due to such variations in the thickness of the growing medium, notably where the variation in the thickness of the growing medium is i) ≥1 cm, ≥2 cm or ≥2.5 cm and/or ≤20 cm, ≤15 cm ≤10 cm or ≤5 cm; and/or ii) ≥10% ≥15% or ≥20% and/or ≤50% or ≤40% of the nominal or average thickness, particularly where such variations of thickness apply to two areas each of 1 m² whose peripheries are spaced between 10 m and 20 m apart.

The water absorbent blanket may comprise mineral wool fibres, notably rock mineral wool fibres. It may comprise needled mineral wool fibres. The fibres may have an average diameter between 2 μm and 9 μm. Physical integrity of the blanket is preferably provided by intertwining of the mineral wool fibres, notably by needling; this provides an advantageous structure. Avoiding the use a binder, particularly avoiding constituents of some binder systems, notably constituents of phenol formaldehyde based binder systems, which may be deleterious to plant growth and/or water absorption, provides an additional advantage. Preferably, the water absorbent blanket is substantially free of organic binders and/or other organic materials. It may have a binder content and/or an organics content and/or a hydrocarbon content which is ≤0.5 wt %, ≤0.2 wt % or ≤0.1 wt %. The preferred structure of the water absorbent blanket when installed in the system is believed to facilitate water take-up and distribution, particularly over the lifetime of the system. During needling or intertwining of the mineral wool fibres, needling aids, for example oils or lubricants, may be used; in this case, these materials are preferably removed prior to use, for example by heat decomposition. Preferably, the majority of the fibres of the needled mineral wool blanket are orientated substantially parallel to its major surface prior to installation in the system and/or substantially parallel to the supporting substrate when installed in the system. At least 50%, at least 60%, at least 70% or at least 80% of the fibres by number may be orientated at an angle which is ≤20°, ≤15° or ≤10° with respect to the major surface and/or the supporting substrate. This provides advantageous distribution of irrigation water throughout the area over which the water absorbent blanket extends.

The water absorbent blanket may have dimensions before installation and/or when installed which include:
  a thickness which is ≥1 cm or ≥1.5 cm and/or ≤3.5 cm or ≤3 cm; or
  a thickness which is ≥3 cm or ≥3.5 cm and/or ≤6 cm, ≤5 cm or ≤4.5 cm; and/or
  a length which is ≥2.5 m, ≥3 m, ≥4 m or ≥5 m and/or ≤9 m or ≤8 m; and/or
  a width which is ≥0.7 m, ≥0.8 m or ≥0.9 m and/or ≤2 m, ≤1.6 m or ≤1.4 m. The water absorbent blanket may be substantially flexible or non-rigid allowing it to be rolled and/or to conform the contours of the supporting substrate when laid. Such dimensions, especially when the blanket is flexible, facilitate manual application of the blanket over the supporting substrate. The blanket may be provided in the form of a roll, notably a roll having a height corresponding to the widths mentioned above and/or a weight which is ≤20 kg, ≤18 kg or ≤15; this facilitated manual handling. Particularly when intended for mechanical handling, for example using tractors or other mechanical equipment, the blanket may be rolled on a core, for example a metal, plastic or cardboard; particularly in such a case, the blanket may have: a length which is ≥8 m or ≥10 m and/or ≤25 m ≤15 m; and/or a weight which is ≥20 kg or ≥25 kg and/or ≤100 kg, ≤60 kg or ≤32 kg. The water absorbent blanket may have a density (when dry) which is ≥70 kg/m³, ≥80 kg/m³, ≥90 kg/m³ or ≥100 kg/m³ and/or ≤140 kg/m³, ≤130 kg/m³ or ≤120 kg/m³.

It may have a water retention, particularly when is does not comprise water absorbent polymers, which is ≥500 l/m³, ≥600 l/m³ or ≥700 l/m³ and/or ≤1200 l/m³, ≤1000 l/m³ or ≤950. This water retention may be the level when first installed and/or after a duration in use of at least 12 months, at least 24 months or at least 36 months.

Preferably, the water absorbent blanket does not comprise water absorbent polymers or water absorbent polymer particles. The long term ecological impact of such materials has not been widely studied and such materials may have a tendency to lose performance over the lifetime of the system.

The water absorbent blanket may comprise one or more fertilisers and/or growing aids and/or seeds. The blanket may be installed at its desired site prior to seeding or planting of vegetation. Alternatively, the blanket may be used as a support for the initial growing of vegetation under controlled or favourable conditions prior to its transfer and incorporation at its desired site.

The landscape growing system may be used to grow one or more of grass, turf, turfgrass, passpalum, bermudagrass, buffalograss or zoysiagrass, ground cover, shrubs or trees.

The system may comprise a moisture sensor configured to detect the amount of water or moisture in the water absorbent blanket. A signal from such sensor may be used to monitor, control, activate or deactivate the irrigation system; this facilitates efficient use of irrigation water to achieve a desired level of moisture for plant growth. Such a system is particularly advantageous where the position of the water absorbent blanket corresponds in general to the upper layer of the vegetation rooting system. This allow the quantity of moisture at the depth of the roots to be monitored directly and with good accuracy. Furthermore, where the water absorbent blanket provides substantial water distribution, measurement of moisture content at one part of the water absorbent blanket, for example at a conveniently located edge of the blanket, provides a rapid and convenient indication of moisture content at all positions of the blanket. Positioning of the moisture sensor below the vegetation and below the growth medium also protects it from damage, for example from sunlight, mowers and foot traffic.

The growing system may be installed by:
  levelling the base ground, when required, to provide a supporting substrate having a desired profile;
  unrolling a first roll of water absorbent blanket on top of the supporting substrate;
  unrolling subsequent rolls of water absorbent blanket on top of the supporting substrate so that adjacent rolls of water absorbent blanket are arranged tightly side by side, preferably with the side of one water absorbent blanket touching the side of its adjacent water absorbent blanket or with a gap of less than 1 cm between adjacent blankets (preferably, the water absorbent blanket may be cut with a knife or with scissors when adjustment of its dimensions is required to cover the desired area);
  evenly distributing the growing medium over the water absorbent blanket.

The system may then be seeded, for example by applying grass or other seeds to the growing medium, or planted. Alternatively, pre-grown vegetation, for example grass sods comprising grass growing in soil, may be applied instead of or in addition to the growing medium.

Once the system has been installed, particular care should be taken to provide adequate water for the first few days or until the roots reach the water absorbent blanket. After that, the watering quantity can slowly be decreased in accordance to the vegetation, soil and climate.

When desired, existing top soil from the installation site may be removed to the desired depth of the water absorbent blanket and subsequently used as the growing medium, notably by being placed over the water absorbent blanket once the water absorbent blanket has been positioned.

The irrigation system may be configured to supply a quantity of irrigation water which is ≤60%, ≤50%, ≤40% or ≤30% of the quantity of irrigation water supplied by comparable prior known irrigation systems. It is surprising that good vegetation growth can be achieved with levels of irrigation so much lower than those that were previously thought necessary. The irrigation system may be configured to supply an average quantity of irrigation water during summer months, notably the months of June and/or July and/or August in the northern hemisphere, which is ≥3 L/m², ≥6 L/m² or ≥9 L/m² per day and/or ≤10 L/m², ≤12 L/m², ≤13 L/m² or ≤15 L/m² per day. The average quantity of irrigation water is calculated over at least one period of consecutive days, for example five, ten, fifteen or thirty consecutive days, notably during the summer months of June and/or July and/or August. The five, ten, fifteen or thirty consecutive days may be consecutive within one of the months of June, July and August or may be a period overlapping two of the months. Preferably the irrigation system is configured to supply, over at least one period of five consecutive days during the months of June and/or July and/or August, an average quantity of irrigation water which is ≥3 L/m² per day and ≤15 L/m² per day and preferably ≤12 L/m², notably in a BWh climate zone (warm desert climate). For irrigation systems installed in the southern hemisphere, for example in Australia, equivalent reasoning may be applied for the summer months of December, January and February. Known irrigation systems in Köppen climate zone BWh (warm desert climate) are typically configured to deliver at least about 19 L/m² of water per day.

An embodiment of the invention will now be described, by way of example only, with reference to the accompanying drawings of which:

Figure 1:
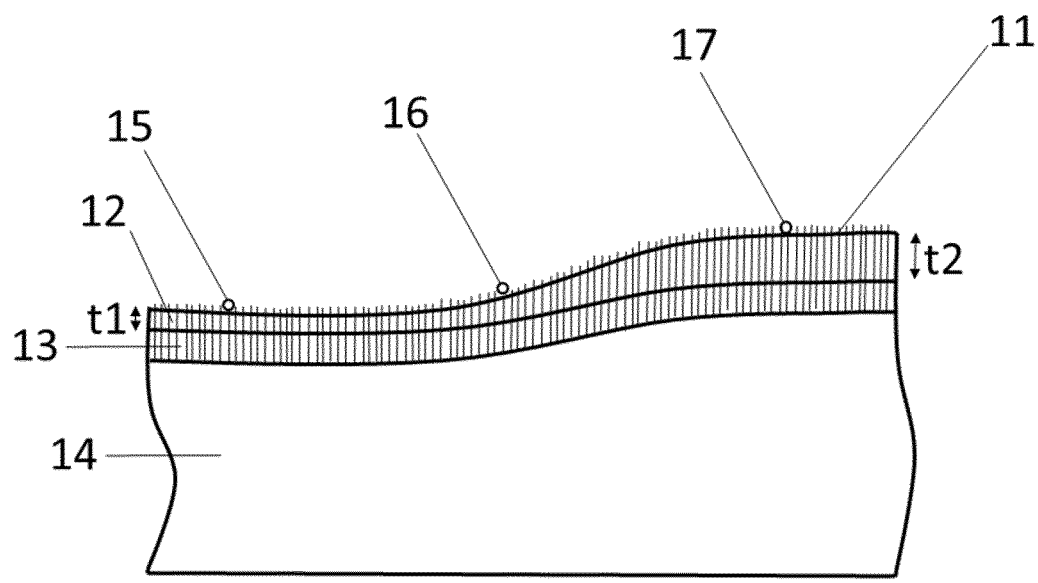
FIG. 1 is cross-section through a landscape growing system.
Figure 2:
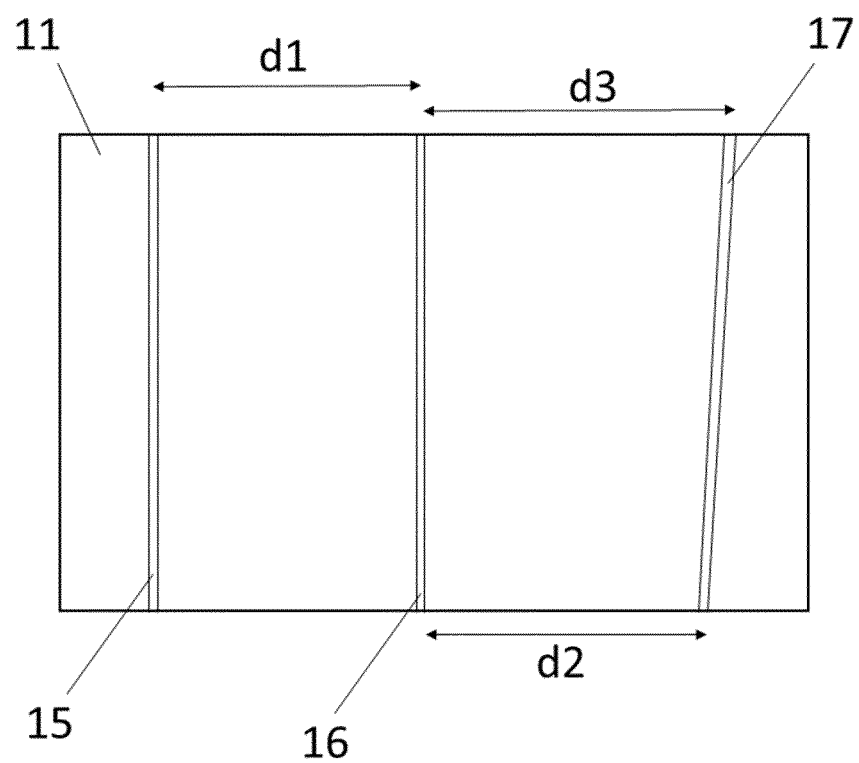
FIG. 2 is a plan view of the landscape of FIG. 1.

The landscape growing system of FIG. 1 and FIG. 2 is part of a public park and comprises:
- a supporting substrate 14 provided by rocks and soil which has be landscaped using mechanical earth moving equipment;
- a water absorbent blanket 13 arranged above the substrate 14 and provided by a layer of needled mineral wool having a thickness of 20 mm and having the majority of its fibres substantially parallel to the substrate 14;
- a growing medium provided by a layer of soil 12 arranged above and spread over the needled mineral felt 13; and
- a plurality of spaced irrigation pipes 15,16,17 arranged above the water absorbent blanket 13, in this case laid on top of the soil 12.

Grass 11 having roots which penetrate the soil layer 12 in to the water absorbent blanket 13 completes the system. The illustrated system is non-planar and the flexible nature of the mineral wool blanket 13 allows it to conform to the profile of the substrate 14. The thickness of the soil covering 12 is non-homogeneous having a thickness t1 in some places and a greater thickness t2 in other places.

It is preferable for adjacent irrigation pipes to be substantially parallel at portions where they provide irrigation; this is the case for irrigation pipes 15 and 16 which are spaced at a distance d1 of about 50 cm. Irrigation pipes 16 and 17 are non-parallel; as each of these irrigation pipes is laid straight their average spacing is the average of the spacing d2 and d3 at their extremities.

Figure 3:
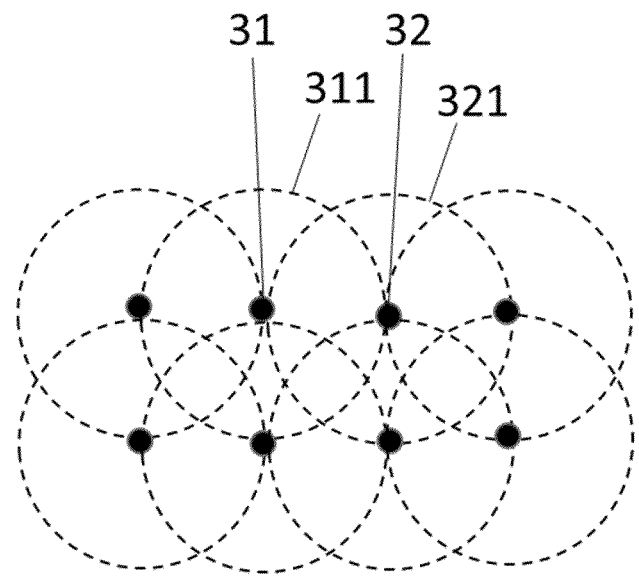
FIG. 3 is a plan view of a prior art arrangement.

FIG. 3 illustrates a prior art arrangement for circle sprinklers typically adopted with the aim of ensuring even distribution of water and avoidance of dry spots. Each sprinkler 31, 32 is spaced from its adjacent sprinklers by a distance which is equal to the radius of its sprinkler pattern 311, 321.

Figure 4:
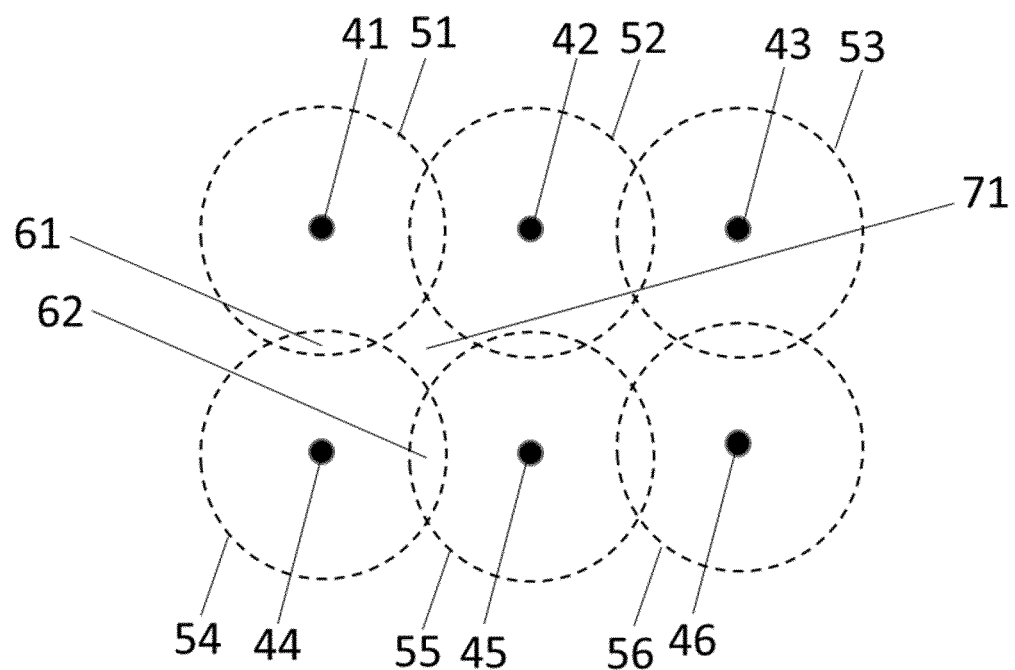
FIG. 4 and FIG. 5 are plan views of alternative landscape growing systems.

FIG. 4 illustrates an arrangement using six rotating circle sprinklers 41, 42, 43, 44, 45, 46 each having a respective sprinkler pattern 51, 52, 53, 54, 55, 56. The sprinkler patterns of adjacent sprinklers overlap, for example as shown between the first 41 and fourth 44 sprinkler at 61 and between the fourth 44 and fifth 45 sprinkler at 62. A gap or non-sprinkled portion 71 nevertheless remains. Each sprinkler is spaced from its adjacent sprinklers by a distance which is greater than the radius of its sprinkler pattern.

Figure 5:
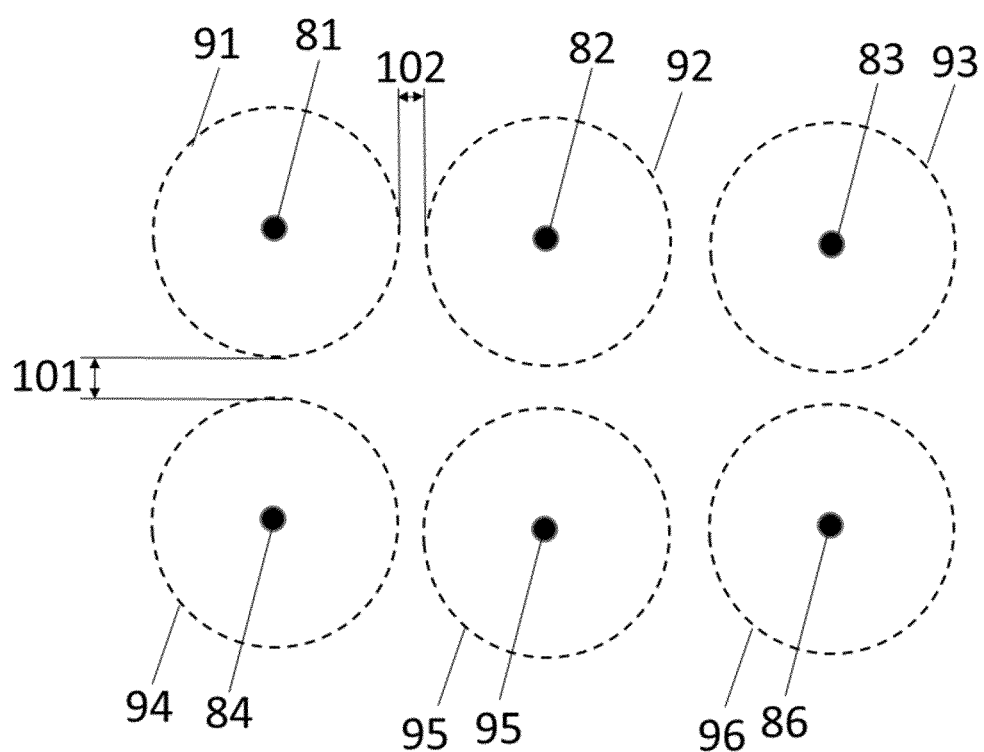
Figure 6:
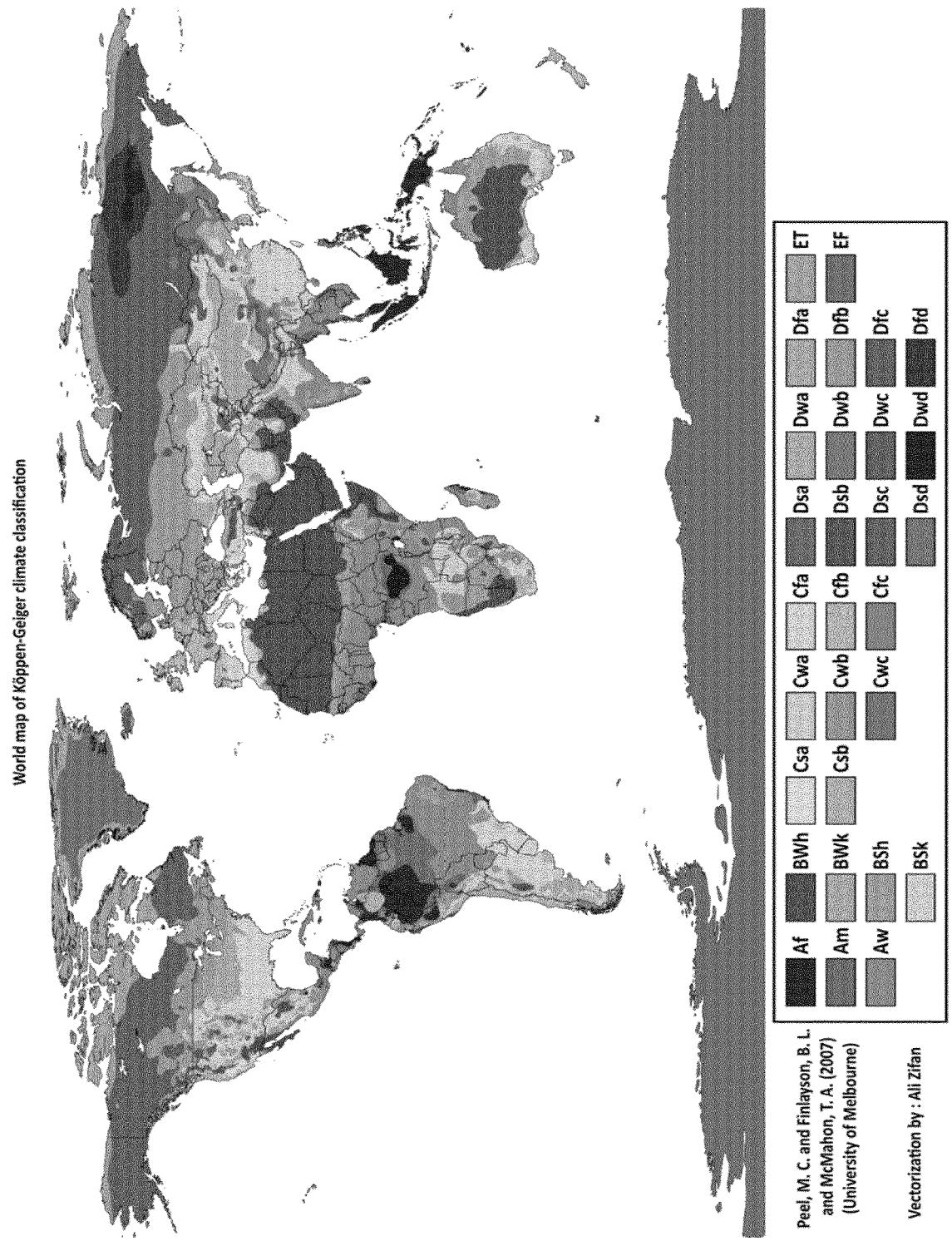
FIG. 6 is a map of the world illustrating Köppen climate zones.
Figure 7:
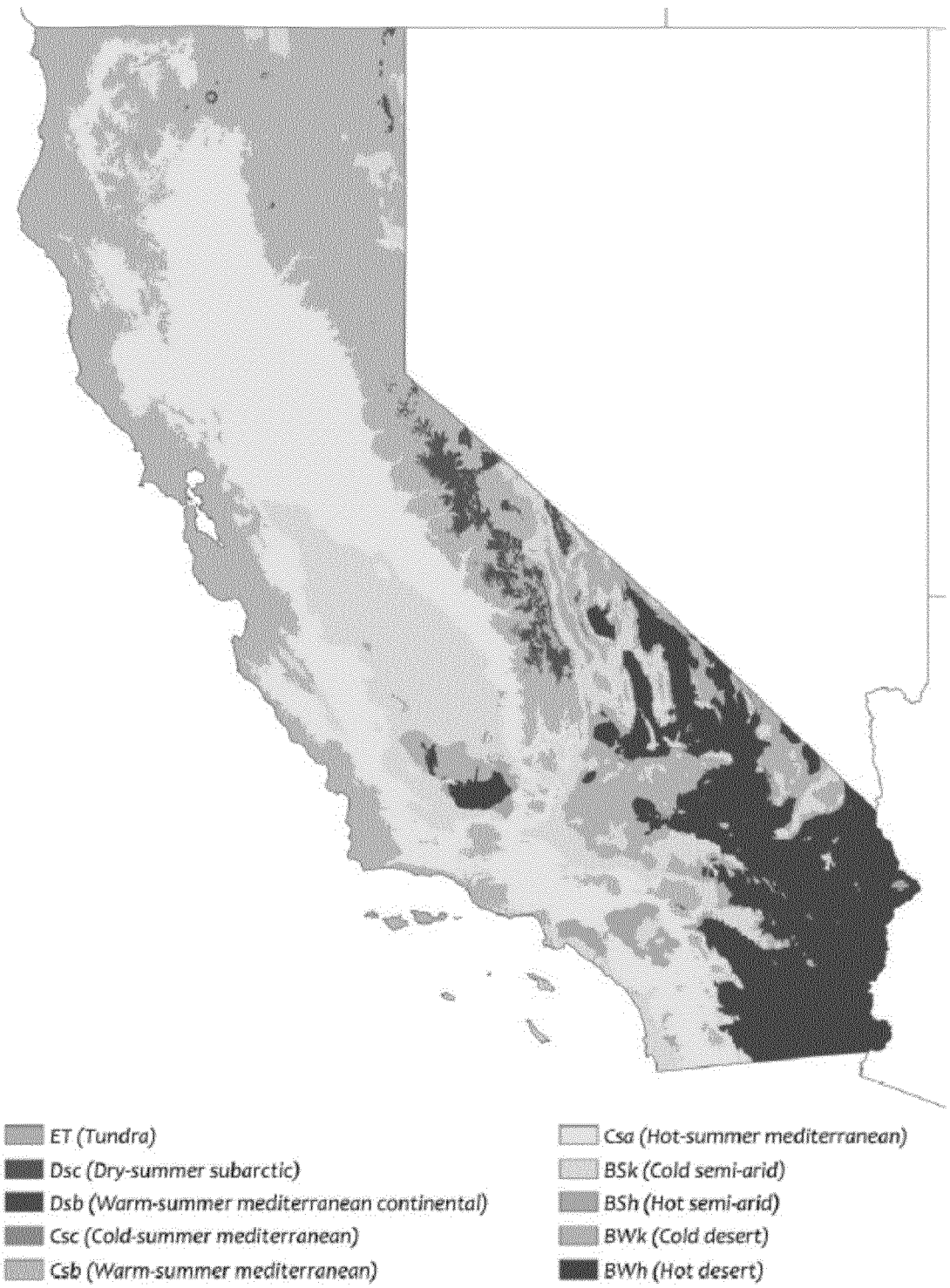
FIG. 7 is a map illustrating Köppen climate zones in California.

In the landscape growing system of FIG. 5, the sprinkler patterns 91, 92, 93, 94, 95, 96 of adjacent sprinklers 81, 82, 83, 84, 85, 86, 87 do not overlap. Indeed, there is a separation 101, 102 of at least 2 cm between adjacent sprinkler patterns.

The combination of the elements of the system in accordance with at least preferred embodiments of the invention provide adequate water distribution, notably thanks to the effect water distribution provided by the water absorbent blanket, such that the configurations illustrated in FIG. 4 and FIG. 5 may be used to ensure adequate water distribution, notably in real conditions, notably which include wind and water pressure drops.

Table 1 shows an example of the quantity of irrigation water supplied according to an embodiment of the invention during the first 15 days of the summer month of June in climate zone B in the northern hemisphere.

TABLE 1

| Day | Daily quantity of irrigation water supplied (L/m²) | Average daily quantity of irrigation water supplied over consecutive five-day period | |
|---|---|---|---|
| | | period | (L/m²) |
| 1 | 0.8 | | |
| 2 | 1.1 | | |
| 3 | 2.3 | | |
| 4 | 3.8 | | |
| 5 | 4.0 | days 1 to 5 | 2.4 |
| 6 | 3.8 | days 2 to 6* | 3.0 |
| 7 | 7.6 | days 3 to 7* | 4.3 |
| 8 | 13.2 | days 4 to 8* | 6.5 |
| 9 | 15.1 | days 5 to 9* | 8.7 |
| 10 | 22.7 | days 6 to 10* | 12.5 |
| 11 | 16.5 | days 7 to 11* | 15.0 |
| 12 | 13.2 | days 8 to 12 | 16.2 |
| 13 | 13.2 | days 9 to 13 | 16.2 |
| 14 | 11.7 | days 10 to 15 | 15.5 |
| 15 | 10.6 | days 11 to 16* | 13.1 |

The periods marked * represent consecutive five day periods over which the average daily quantity of irrigation water supplied was ≥3 L/m² per day and ≤15 L/m². The expression L/m² as used herein refers to litres of irrigation water per m² of the irrigation landscape growing system.

The invention claimed is:

1. A fixed irrigation landscape growing system installed in a region selected from: a Köppen climate region BWh (warm desert climate), BWk (cold desert climate), BSh (warm semi-arid climate), BSk (cold semi-arid climate), Csa (warm Mediterranean climate), Csb (temperate Mediterranean climate), California and a Köppen zone Csb, Csa, BS and BW in California; comprising:
   a supporting substrate;
   a water absorbent blanket comprising needled mineral wool fibers and being arranged above the substrate, in which at least 50% of the fibers by number of the needled mineral wool blanket are orientated at an angle of ≤20° with respect to the major surface of the needled mineral wool blanket;
   a growing medium arranged above the water absorbent blanket; and
   an irrigation system selected from:
   a) a plurality of spaced irrigation pipes arranged above the water absorbent blanket in which the average spacing between the irrigation pipes is at least 30 cm; and
   b) a plurality of spaced circle irrigation sprinklers arranged above the growing medium in which the distance between a first sprinkler and each of its adjacent sprinklers is greater than 1.2 times the radius of the sprinkler pattern of the first sprinkler.

2. The fixed irrigation landscape growing system of claim 1, in which
   the irrigation system is selected from a) the plurality of spaced irrigation pipes arranged above the water absorbent blanket in which the average spacing between the irrigation pipes is at least 30 cm; and
   in which the plurality of the spaced irrigation pipes are arranged between the water absorbent blanket and the growing medium.

3. The fixed irrigation landscape growing system of claim 1, in which the irrigation system is selected from a) the plurality of spaced irrigation pipes arranged above the water absorbent blanket in which the average spacing between the irrigation pipes is at least 30 cm; and
   in which the plurality of spaced irrigation pipes are arranged above the growing medium.

4. The fixed irrigation landscape growing system of claim 1, in which the irrigation system is selected from b) the plurality of spaced circle irrigation sprinklers arranged above the growing medium in which the distance between a first sprinkler and each of its adjacent sprinklers is greater than 1.2 times the radius of the sprinkler pattern of the first sprinkler; and
   in which the sprinkler patterns of the adjacent sprinklers leave a non-sprinkled area which is ≥0.01% of the area of the sprinkler pattern of one of the sprinklers.

5. The A-fixed irrigation landscape growing system of claim 1, in which the irrigation system is selected from b) the plurality of spaced circle irrigation sprinklers arranged above the growing medium in which the distance between a first sprinkler and each of its adjacent sprinklers is greater than 1.2 times the radius of the sprinkler pattern of the first sprinkler; and
   in which the plurality of irrigation sprinklers are arranged with a spacing of at least 2 cm between the sprinkler patterns of adjacent sprinklers.

6. The fixed irrigation landscape growing system of claim 1, in which the water absorbent blanket comprises binderless mineral wool fibers.

7. The fixed irrigation landscape growing system of claim 1, in which the water absorbent blanket has a thickness in the range 10 mm to 50 mm.

8. The fixed irrigation landscape growing system of claim 1, in which the water absorbent blanket has the form of a continuous strip having
   a length which is ≥4 m and a width which is ≥0.7 m.

9. The fixed irrigation landscape growing system of claim 1, in which the water absorbent blanket has a water retention which is ≥500 l/m$^3$.

10. The fixed irrigation landscape growing system of claim 1, in which the water absorbent blanket is free of superabsorbent polymers.

11. The fixed irrigation landscape growing system of claim 1, in which the growing system comprises grass growing through and protruding from the growth medium.

12. The fixed irrigation landscape growing system of claim 1, in which the landscape growing system is a grass covered portion of a park.

13. The fixed irrigation landscape growing system of claim 1, in which the landscape growing system forms part of a sports surface selected from a golf course and a sports pitch.

14. The fixed irrigation landscape growing system of claim 1, in which the irrigation system is selected from a) the plurality of spaced irrigation pipes arranged above the water absorbent blanket in which the average spacing between the irrigation pipes is at least 30 cm, and
   in which the average spacing between the irrigation pipes is ≤2 m.

15. The fixed irrigation landscape growing system of claim 1, in which the growing medium is a soil layer.

16. The fixed irrigation landscape growing system of claim 1, in which the irrigation system is selected from a) the plurality of spaced irrigation pipes arranged above the water absorbent blanket and in which the average spacing between the irrigation pipes is at least 40 cm.

17. The fixed irrigation landscape growing system of claim 1, in which the irrigation system is configured to supply, over at least one period of five consecutive days during the months of June, July and August an average quantity of irrigation water which is ≥3 L/m$^2$ per day and ≤15 L/m$^2$ per day.

18. The fixed irrigation landscape growing system of claim 1, in which the water absorbent blanket has a thickness in the range 15 mm to 25 mm.

19. The fixed irrigation landscape growing system of claim 1, in which the water absorbent blanket has the form of a continuous strip having a length which is ≤9 m and a width which is ≤2 m.

20. The fixed irrigation landscape growing system of claim 1, in which the landscape growing system is a grass covered portion having an area of at least 10000 m$^2$.

21. A method of irrigating a landscape growing system installed in a region selected from: a Köppen climate region BWh (warm desert climate), BWk (cold desert climate), BSh (warm semi-arid climate), BSk (cold semi-arid climate), Csa (warm Mediterranean climate), Csb (temperate Mediterranean climate), California and a Koppen zone Csb, Csa, BS and BW in California;
   wherein the landscape growing system comprises:
   a supporting substrate;
   a water absorbent blanket comprising needled mineral wool fibers and being arranged above the supporting substrate, in which at least 50% of the fibers by number of the needled mineral wood blanket are orientated at an angle of ≤20° with respect to the major surface of the needled mineral wood blanket;

a growing medium arranged above the water absorbent blanket; and a fixed irrigation system;

wherein the method comprises supplying an average quantity of irrigation water which is ≥3 $L/m^2$ per day and ≤15 $L/m^2$ per day to the landscape growing system through the irrigation system over at least one period of five consecutive days during the months of June, July and August.

22. The method of irrigating a landscape growing system of claim 21, in which the irrigation system is selected from: a) an irrigation system comprising a plurality of spaced irrigation pipes arranged above the water absorbent blanket and b) an irrigation system comprising a plurality of spaced circle irrigation sprinklers arranged above the growing medium.

* * * * *